US011602725B2

(12) United States Patent
Xu et al.

(10) Patent No.: US 11,602,725 B2
(45) Date of Patent: Mar. 14, 2023

(54) DEVICE FOR RAPIDLY PREPARING BETA-SI3N4 BY GAS-SOLID REACTION, AND METHOD THEREOF

(71) Applicant: Kunming University of Science and Technology, Yunnan (CN)

(72) Inventors: Lei Xu, Yunnan (CN); Libo Zhang, Yunnan (CN); Hang Li, Yunnan (CN); Zhaohui Han, Yunnan (CN); Jianhua Liu, Yunnan (CN); Hongying Xia, Yunnan (CN); Zhimeng Tang, Yunnan (CN); Lirong Guo, Yunnan (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 17/540,229

(22) Filed: Dec. 1, 2021

(65) Prior Publication Data
US 2022/0280907 A1  Sep. 8, 2022

(30) Foreign Application Priority Data
Mar. 8, 2021  (CN) .......................... 202110248782.0

(51) Int. Cl.
*B01J 4/00* (2006.01)
*B01J 8/00* (2006.01)
*B01J 19/00* (2006.01)
(Continued)

(52) U.S. Cl.
CPC ........... *B01J 19/1812* (2013.01); *B01J 4/001* (2013.01); *B01J 4/008* (2013.01); *B01J 8/0045* (2013.01);
(Continued)

(58) Field of Classification Search
CPC ..... B01J 4/00; B01J 4/001; B01J 4/008; B01J 8/00; B01J 8/0015; B01J 8/0045;
(Continued)

(56) References Cited

U.S. PATENT DOCUMENTS

2014/0305786 A1* 10/2014 Beaver .................... C10B 53/07
202/110

FOREIGN PATENT DOCUMENTS

CN         1792774 A     6/2006
CN       103183324 A     7/2013
(Continued)

OTHER PUBLICATIONS

Machine translation of JP 59-111905 A, provided with IDS filed on Dec. 1, 2021 and published Jun. 28, 1984. (Year: 1984).*
(Continued)

*Primary Examiner* — Natasha E Young
(74) *Attorney, Agent, or Firm* — Bayramoglu Law Offices LLC (57) ABSTRACT

A device for rapidly preparing β-Si3N4 by gas-solid reaction and a method thereof, and relates to the technical field of recycling and reuse of waste fine silicon powder. The bottom of a stock bin communicates with a first opening and closing passage, a first connection passage, and the top of a first transitional bin; the bottom of the first transitional bin communicates with the first opening and closing passage, a second connection passage, and the top of a reaction bin; the bottom of the reaction bin communicates with a second opening and closing passage, the first connection passage, and the top of a second transitional bin; the bottom of the second transitional bin communicates with the top of a conveying passage through the first opening and closing passage; a material outlet of the conveying bin communicates with the collection bin.

18 Claims, 8 Drawing Sheets

(51) Int. Cl.
    *B01J 19/18* (2006.01)
    *C01B 21/068* (2006.01)

(52) U.S. Cl.
    CPC ....... *B01J 19/0053* (2013.01); *C01B 21/0682* (2013.01); *B01J 2219/00058* (2013.01); *B01J 2219/00141* (2013.01); *B01J 2219/00162* (2013.01)

(58) Field of Classification Search
    CPC ........ B01J 19/00; B01J 19/0053; B01J 19/18; B01J 19/1812; B01J 2219/00; B01J 2219/00049; B01J 2219/00051; B01J 2219/00054; B01J 2219/00056; B01J 2219/00058; B01J 2219/00139; B01J 2219/00141; B01J 2219/00162; C01B 21/00; C01B 21/06; C01B 21/068; C01B 21/0682; Y02P 20/00; Y02P 20/10; Y02W 30/00; Y02W 30/20
See application file for complete search history.

(56) References Cited

FOREIGN PATENT DOCUMENTS

| | | | |
|---|---|---|---|
| CN | 103332662 A | 10/2013 | |
| CN | 107285287 A | 10/2017 | |
| CN | 108557780 A | 9/2018 | |
| CN | 108622864 A | 10/2018 | |
| CN | 209098183 U | 7/2019 | |
| EP | 667323 A2 * | 8/1995 | ......... C04B 35/5935 |
| EP | 1829844 A1 * | 9/2007 | ........... C04B 35/591 |
| JP | S59111905 A | 6/1984 | |

OTHER PUBLICATIONS

CN-107199008-A with machine translation, published on Sep. 26, 2017 (Year: 2017).*

* cited by examiner

DEVICE FOR RAPIDLY PREPARING BETA-SI3N4 BY GAS-SOLID REACTION, AND METHOD THEREOF

CROSS-REFERENCE TO THE RELATED APPLICATIONS

This application claims priority to Chinese Patent Application No. 202110248782.0, filed on Mar. 8, 2021, the entire contents of which are incorporated herein by reference.

FIELD OF THE INVENTION

The present disclosure relates to the technical field of recycling and reusing of waste fine silicon powders, specifically to a device for rapidly preparing β-$Si_3N_4$ by gas-solid reaction, and a method thereof.

BACKGROUND OF THE INVENTION

In recent years, with the rapid development of photovoltaic industry and semiconductor industry, the global demand for solar-grade silicon has grown rapidly. In a production process of solar cell integrated panels, a silicon rod/sheet needs to be cut. A large number of cutting wastes will be generated during the cutting. Waste components mainly include silicon, silicon carbide, cutting fluid, and metal waste scraps. In the early stage, such wastes are directly discarded or stored in piles. In the later stage, after the wastes are separated and purified according to researches, finely granular silicon powder can be recycled.

Huang Meiling et al. used fatty acids as collectors to separate silicon from silicon carbide powder by froth flotation. The optimal process conditions of this method are that pH is 4.5, the concentration of a foaming agent is 0.18 mol/L, and the concentration of the collector is 0.315 mol/L. By means of this process, a mixture with a silicon content of greater than 96% and a silicon carbide content of less than 3% can be obtained respectively. Wu et al. proposed to use an external electric field and a gravity field to separate silicon from silicon carbide. This method uses the differences in particle size, density, and surface Zeta potential of the silicon and the silicon carbide to achieve the separation. The particle size, density, and Zeta potential within a certain pH value range of the fine silicon powder are less than those of the silicon carbide. Under the combined action of an electric field force and the gravity, the silicon particles move farther toward an anode and fall to a region close to the anode, while the silicon carbide falls to a region closer to a cathode. For a waste with a silicon content of 75.3%, after separation by this method, the content of silicon powder can be increased to 92.8%.

There are also a large number of foreign scholars studying the recycling of solar silicon wafer cutting wastes. Kapur et al. proposed to use the foam flotation to separate the fine silicon powder from the silicon carbide. Firstly, a flocculant and the cutting waste are uniformly mixed and then stand until floccules completely float on the surface. The floccules are then separated by filtration and other methods. The separated floccules can be further separated and purified. Tai et al. proposed to use a heavy liquid method to separate the fine silicon powder from the silicon carbide. Firstly, polyethylene glycol and metals are removed by acetone and acid pickling, and then a solution with a density between the density of the silicon and the density of the silicon carbide is prepared with tribromomethane and ethanol; and the solution is stirred, uniformly mixed, and centrifugated. The silicon carbide settles at the bottom because its density is greater than that of the solution, and the fine silicon powder is suspended at the top because its density is less than that of the solution. Enriched matters of the two parts are separated to achieve the purpose of recycling the silicon and the silicon carbide separately.

After the cutting waste is separated and purified for multiple times, the waste fine silicon powder in the present application obtained has the silicon content up to 99.9%, the particle size distributed between 1 μm and 70 μm, belonging to the micron level, and the average particle size at about 30 μm. The main silicon form is fine debris. There is no fixed form. However, how to realize high-value reuse of the recycled waste fine silicon powder is also a problem needing to be solved urgently.

The regular octahedral structure of $Si_3N_4$ (silicon nitride) makes a $Si_3N_4$ material have excellent mechanical properties, thermal properties, chemical stability, and the like. It is an important structural ceramic material and is considered to be a material with the highest application potential from among high-temperature structural ceramic materials. Due to their good thermal shock stability, excellent oxidation resistance, cold and thermal shock resistance, abrasion resistance, self-lubrication, and many other excellent physical and chemical properties, products of $Si_3N_4$ have attracted more and more attentions, have been widely used to make high-temperature-resistant parts of gas engines, corrosion-resistant and wear-resistant parts in the chemical industry, high-speed cutting tools, and high-temperature ceramic bearings, etc., have been applied to machinery, chemical, electronic and military industries and other industries, and are considered to be a material with the highest application potential from among high-temperature structural ceramics.

Common methods for preparing $Si_3N_4$ powder include: self-propagating high temperature synthesis (SHS), direct nitridation for silicon powder, gas phase, and carbothermic reduction. The direct nitridation method has attracted much attention because of its simple process flow and low production cost. However, the biggest problem of this method at present is that there is no suitable production device. The patent CN1792774A discloses a method for continuously synthesizing silicon nitride powder using a fluidized bed technology at a normal pressure. The silicon powder or a mixture of the silicon powder and silicon nitride is quickly fluidized at a normal temperature by taking high-purity nitrogen as carrier gas, and leaves a fast fluidized bed in an entrainment manner; and a gas-solid two-phase flow composed of powder and nitrogen enters a high-temperature region of a high-temperature nitriding furnace, continuously passes through the high-temperature nitriding furnace in a dilute phase pneumatic conveying manner, and is cooled and collected to obtain silicon nitride powder. Products are mainly amorphous, α-phase, β-phase or their mixture. α-$Si_3N_4$ is the most. Compared with β-phase, the stability of the α-$Si_3N_4$ is low. Therefore, it is in urgent need for developing a device and method for rapidly preparing silicon nitride mainly including β-$Si_3N_4$ to further realize high-value reuse of waste fine silicon powder.

SUMMARY OF THE INVENTION

The present disclosure aims to provide a device for rapidly preparing β-$Si_3N_4$ by gas-solid reaction, and a method thereof, so as to solve the problem that it is hard for existing equipment to produce silicon nitride mainly including β-$Si_3N_4$.

To solve the above technical problem, the present disclosure adopts the following technical solution: a device for rapidly preparing $\beta$-$Si_3N_4$ by gas-solid reaction is characterized by including a stock bin, a first transitional bin, a reaction bin, a second transitional bin, a conveying bin, and a collection bin. The bottom of the stock bin communicates with a first opening and closing passage, a first connection passage, and the top of the first transitional bin in sequence; the bottom of the first transitional bin communicates with the first opening and closing passage, a second connection passage, and the top of the reaction bin in sequence; the bottom of the reaction bin communicates with a second opening and closing passage, the first connection passage, and the top of the second transitional bin in sequence; the bottom of the second transitional bin communicates with the top of the conveying passage through the first opening and closing passage; a material outlet of the conveying bin communicates with the collection bin; the first connection passage is a hollow pipeline and is provided with a pressure gauge, a vacuum pump, and a gas inlet on a side wall; the second connection passage is a hollow pipeline and is provided with a pressure gauge and a pressure exhaust valve on a side wall; and a gas intake pipeline is arranged in the middle of the second opening and closing passage.

In a further technical solution, the first opening and closing passage is composed of a first passage pipe, a fan blade fixing piece, a first fan blade, and a transmission pair; the ringlike fan blade fixing piece is fixed inside the first passage pipe; three or more first fan blades are provided; one end of each first fan blade is hinged to the fan blade fixing piece, and the bottom of the other end of the first fan blade is connected with a driven wheel of the transmission pair through a rotating shaft; the driven wheel is sleeved in the first passage pipe; the driven wheel is engaged with a driving wheel; the driving wheel is rotatably arranged in a side wall of the first passage pipe; one side of the driving wheel is provided with a rotating handle; and a free end of the rotating handle is located on the outer side of the first passage pipe.

In a further technical solution, the second opening and closing passage is composed of a second passage pipe, a fan blade fixing piece, a second fan blade, and a transmission pair; the ringlike fan blade fixing piece is fixed inside the second passage pipe; three or more second fan blades are provided; one end of each second fan blade is hinged to the fan blade fixing piece, and the bottom of the other end of the second fan blade is connected with a driven wheel of the transmission pair through a rotating shaft; the driven wheel is sleeved in the second passage pipe; the driven wheel is engaged with a driving wheel; the driving wheel is rotatably arranged in a side wall of the second passage pipe; one side of the driving wheel is provided with a rotating handle; a free end of the rotating handle is located on the outer side of the second passage pipe; the gas intake pipeline is composed of a gas intake pipe and a gas sprayer; one end of the gas intake pipe passes through the side wall of the second passage pipe and is connected with a gas intake device, and the other end of the gas intake pipe is connected with the gas sprayer; the gas sprayer is located at the bottom of the reaction bin; and the second fan blade is in close contact with the outer side wall of the gas intake pipe at the lower part of the gas sprayer after being closed.

In a further technical solution, a transfer guide plate is arranged on the inner side of the top of the second connection passage, and a rotating chute is arranged below the transfer guide plate.

In a further technical solution, the reaction bin is composed of a heating furnace tube, a heat insulation layer, a shell, a microwave generator, and a temperature measurement device; the heating furnace tube communicates with the second opening and closing passage; a space between the shell and the heating furnace tube is filled with a heat insulation layer; and the microwave generator and the temperature measurement device are distributed on the shell.

In a further technical solution, three rows of the microwave generators are uniformly disposed along a height direction of the heating furnace tube; in each row, three microwave generators are uniformly distributed along a radial direction of the heating furnace tube; and three temperature measurement devices are uniformly disposed along the height direction of the heating furnace tube.

In a further technical solution, the second transitional bin is composed of an inner pipe and an outer pipe which are coaxially disposed; the gas intake pipe is wound on the outer side wall of the inner pipe; a gap formed by the outer side wall of the inner pipe and the inner side wall of the outer pipe is filled with a heat insulation material to preheat gas in the gas intake pipe.

In a further technical solution, the conveying bin is L-shaped, a horizontal section of which is internally provided with a transfer screw rod; one end of the transfer screw rod is connected with a motor; and the collection bin is arranged below the other end of the transfer screw rod.

In a further technical solution, a water cooling device is arranged on the outer side wall of the horizontal section of the conveying bin.

In a further technical solution, a method of the device for producing $\beta$-$Si_3N_4$ is as follows:

1) opening the first opening and closing passage between the stock bin and the first transitional bin so that waste fine silicon powder enters the first transitional bin, closing the first opening and closing passage, vacuumizing the first transitional bin, filling the vacuumized first transitional bin with pure $N_2$, and maintaining the pressure at 0.1 MPa to 0.3 MPa;

2) opening the first opening and closing passage between the first transitional bin and the reaction bin so that the waste fine silicon powder enters the reaction bin, spraying at least one of $N_2$ and $NH_3$ by the gas intake pipeline, synchronously heating reactants at a temperature rise rate of 100° C./min, maintaining the temperature for 5 to 20 min when the temperature in the reaction bin reaches 1250+/−100° C., and maintaining the gas pressure in the reaction bin at 0.1 MPa to 0.3 MPa;

3) in the reaction process, synchronously vacuumizing the second transitional bin, then filling the vacuumized second transitional bin with the pure $N_2$, and maintaining the pressure at 0.1 MPa to 0.3 MPa; after the reaction ends, opening the second opening and closing passage between the reaction bin and the second transitional bin; and after reaction products enter the second transitional bin, opening the first opening and closing passage between the second transitional bin and the conveying bin so that the reaction products enter, through the conveying bin, the collection bin for collection and storage.

Compared with the prior art, the present disclosure has the following beneficial effects.

By means of the arrangement of the transitional bin, air is avoided from entering the reaction bin, and foreign gas is prevented from reacting with the silicon powder, so that a product is pure. Moreover, by means of the arrangement of the transitional bin, the gas pressures in the transitional bin and the reaction bin are kept balanced, so as to facilitate the conveying of materials between all the bins.

By means of the arrangement of the opening and closing passages, connection and closing between all the bins are facilitated. By means of rotating the rotating handle, the transmission pairs rotate each other to drive the fan blades to be opened and closed, thus opening and closing the opening and closing passages; the operation is simple, convenient, and fast; and the rotating handle can be adjusted automatically or manually.

By means of the arrangement of the connection passages, functions for filling the bin with the nitrogen, vacuumizing the bin, monitoring the pressure, exhausting gas, and the like are realized. Reaction gas is fed into the reaction in through the gas intake pipeline. At the same time, the reaction is blown from bottom to top, which will also blow up the silicon powder and make the silicon powder in a suspension device. This also makes $N_2$ contact the silicon powder more fully in the heating process, thus improving the interfacial reaction kinetics to obtain a $Si_3N_4$ material with good compactness and good overall performance.

The waste fine silicon powder is transported by the transfer guide plate, and is more uniformly distributed in the reaction bin under the action of the rotating chute.

Microwaves are used as a heating source. The microwaves are used to heat the reactants by the vibration of polar molecules under the action of an alternating electromagnetic field, which greatly reduces the temperature required by reaction and shortens the reaction time. No additive needs to be added in the reaction process. Meanwhile, the microwaves can also penetrate through a silicon nitride layer on a silicon surface and continues to heat the interior. Only 1.8 kWh of nitriding reaction energy will be consumed when the microwaves heat 100 g of silicon powder, which is much less than the energy consumed for conventional heating, so that the energy consumption can be reduced by 88.6% or above. A significant energy-saving effect is achieved. The reaction product, i.e., silicon nitride, obtained by this device mainly includes $\beta$-$Si_3N_4$ that accounts for 97.96%, while $\alpha$-$Si_3N_4$ accounts for about 2%.

The heat insulation material is arranged outside the second transitional bin, and the gas intake pipe is wound at the same time. The gas intake pipe is closely fitted to the outer side wall of the inner pipe. Gas exchanges heat with the high-temperature silicon nitride in the pipe when flowing through the gas intake pipe, so as to preheat the reaction gas that is going to enter the reaction bin, which further saves the heat energy supplied to the reaction bin and cools the high-temperature silicon nitride at the same time.

When the reaction bin is emptied, the material in the first transitional bin can continue to enter the reaction bin for reaction, so as to realize rapid and continuous preparation of the $\beta$-$Si_3N_4$, thus greatly improving the production efficiency and reducing the cost.

The above device and method are easy and convenient to operate and environmentally friendly, have significant advantages in the aspect of saving energy, and have low production cost and good production continuity.

In the drawings: 1: stock bin; 2: first transitional bin; 3: reaction bin; 301: heating furnace tube; 302: heat insulation layer; 303: shell; 304: microwave generator; 305: temperature measurement device; 4: second transitional bin; 401: inner pipe; 402: outer pipe; 5: conveying bin; 501: transfer screw rod; 502: motor; 6: collection bin; 7: first opening and closing passage; 701: first passage pipe; 702: fan blade fixing piece; 703: first fan blade; 704: transmission pair; 705: rotating shaft; 706: driven wheel; 707: driving wheel; 708: rotating handle; 8: first connection passage; 9: second connection passage; 901: transfer guide plate; 902: rotating chute; 10: second opening and closing passage; 1001: second passage pipe; 1002: second fan blade; 11: pressure gauge; 12: vacuum pump; 13: pressure exhaust valve; 14: gas intake pipeline; 1401: gas intake pipe; 1402: gas sprayer; 15: heat insulation material; 16: water cooling device; 17: gas inlet.

DETAILED DESCRIPTION OF THE EMBODIMENTS

In order to make the objectives, technical solutions, and advantages of the present disclosure clearer, the invention is further described below in detail with reference to accompanying drawings and embodiments. It should be understood that the specific embodiments described here are merely to explain the present invention, and not intended to limit the present disclosure.

Figure 1:
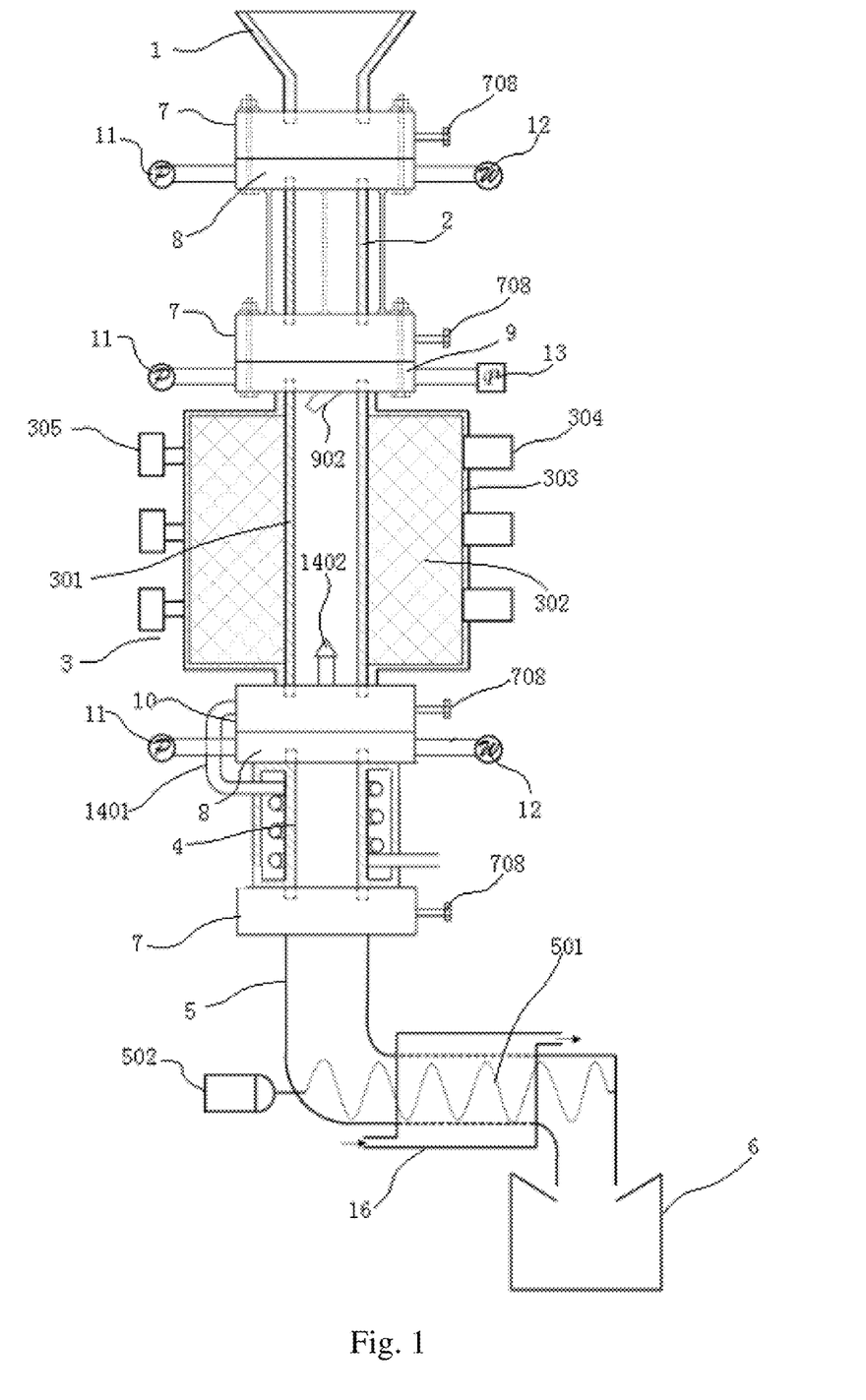
FIG. 1 is a schematic structural diagram of the present disclosure.
Figure 7:
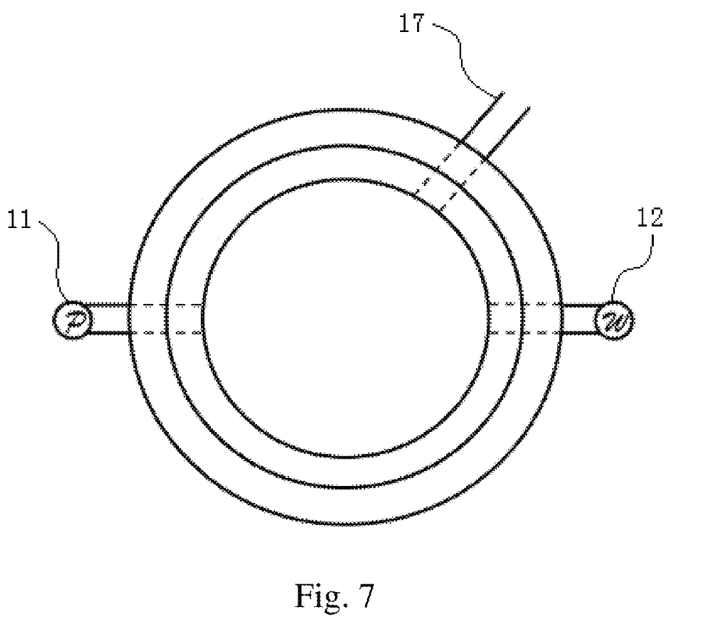
FIG. 7 is a schematic structural diagram of a first connection passage in the present disclosure.
Figure 8:
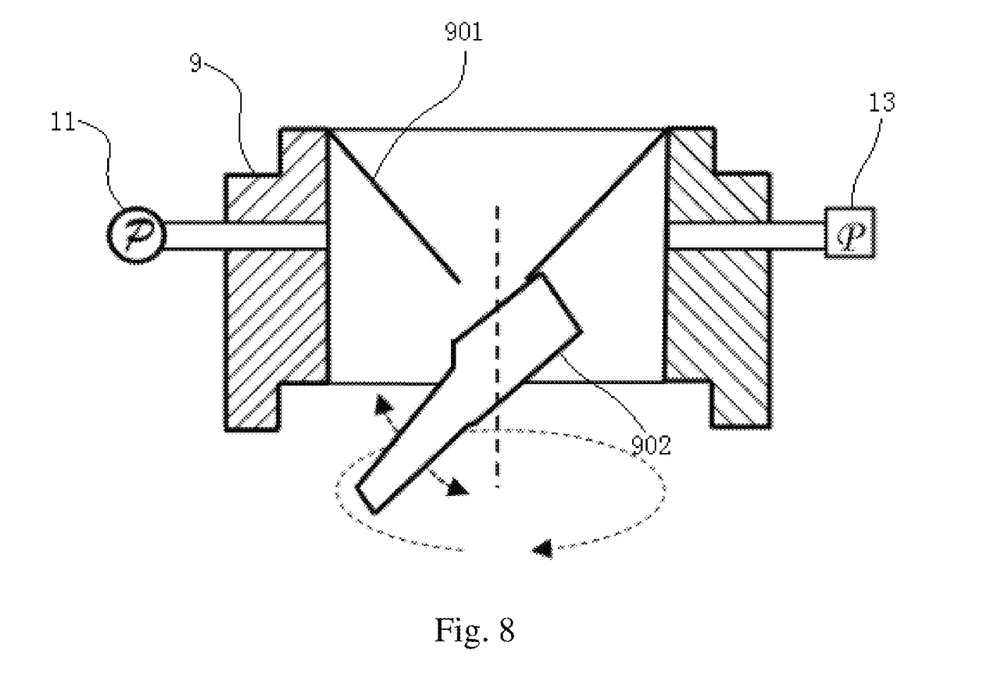
FIG. 8 is a schematic structural diagram of a second connection passage in the present disclosure.

FIG. 1 illustrates a device for rapidly preparing $\beta$-$Si_3N_4$ by gas-solid reaction. The device includes a stock bin 1, a first transitional bin 2, a reaction bin 3, a second transitional bin 4, a conveying bin 5, and a collection bin 6. The bottom of the stock bin 1 communicates with a first opening and closing passage 7, a first connection passage 8, and the top of the first transitional bin 2 in sequence; the bottom of the first transitional bin 2 communicates with the first opening and closing passage 7, a second connection passage 9, and the top of the reaction bin 3 in sequence; the bottom of the reaction bin 3 communicates with a second opening and closing passage 10, the first connection passage 8, and the top of the second transitional bin 4 in sequence; the bottom of the second transitional bin 4 communicates with the top of the conveying passage 5 through the first opening and closing passage 7; and a material outlet of the conveying bin 5 communicates with the collection bin 6. As shown in FIG. 7, the first connection passage 8 is a hollow pipeline and is provided with a pressure gauge 11, a vacuum pump 12, and a gas inlet 17 on a side wall. As shown in FIG. 8, the second connection passage 9 is a hollow pipeline and is provided with a pressure gauge 11 and a pressure exhaust valve 13 on a side wall; and a gas intake pipeline 14 is arranged in the middle of the second opening and closing passage 10. For the convenience of transfer, a transfer guide plate 901 is arranged on the inner side of the top of the second connection passage 9, and a rotating chute 902 is arranged below the transfer guide plate 901.

The conveying bin 5 is L-shaped, a horizontal section of which is internally provided with a transfer screw rod 501; one end of the transfer screw rod 501 is connected with a motor 502; and the collection bin 6 is arranged below the other end of the transfer screw rod 501. To further cool a silicon nitride product, a water cooling device 16 is arranged on the outer side wall of the horizontal section of the conveying bin 5.

Figure 3:
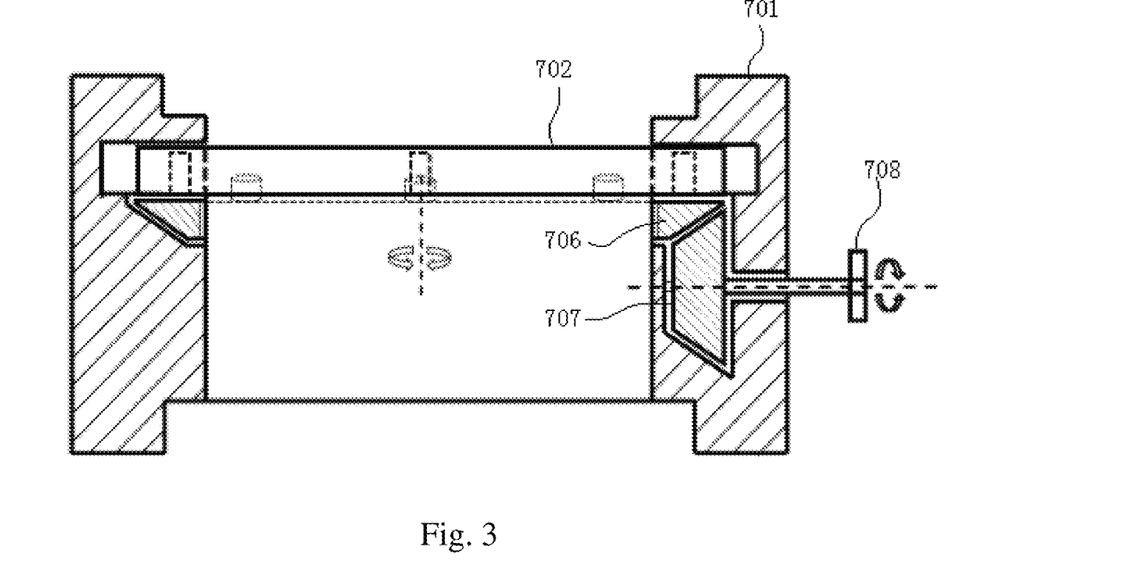
FIG. 3 is a schematic structural diagram of a first opening and closing passage in the present disclosure.

The stock bin 1 has a conical top. To realize automatic feeding, a feeding belt conveyor is arranged above it. For the convenience of opening and closing of the first opening and closing passage 7, as shown in FIG. 3, the first opening and closing passage 7 is composed of a first passage pipe 701, a fan blade fixing piece 702, a first fan blade 703, and a transmission pair 704; the ringlike fan blade fixing piece 702 is fixed inside the first passage pipe 701; three first fan blades 703 are provided; one end of each first fan blade 703 is hinged to the fan blade fixing piece 702, and the bottom of the other end of the first fan blade is connected with a driven wheel 706 of the transmission pair 704 through a rotating shaft 705; and the rotating shaft 705 passes through a sliding chute arranged on the fan blade fixing piece 702. The transmission pair 704 here can select mutually perpendicular bevel gears. The rotating shaft 705 is connected with the driven wheel 706 in the transmission pair 704; the driven wheel 706 is sleeved in the first passage pipe 701 and is engaged with a driving wheel 707; the driving wheel 707 is rotatably arranged in a side wall of the first passage pipe 701; one side of the driving wheel 707 is provided with a rotating handle 708; and a free end of the rotating handle 708 is located on the outer side of the first passage pipe 701.

Figure 4:
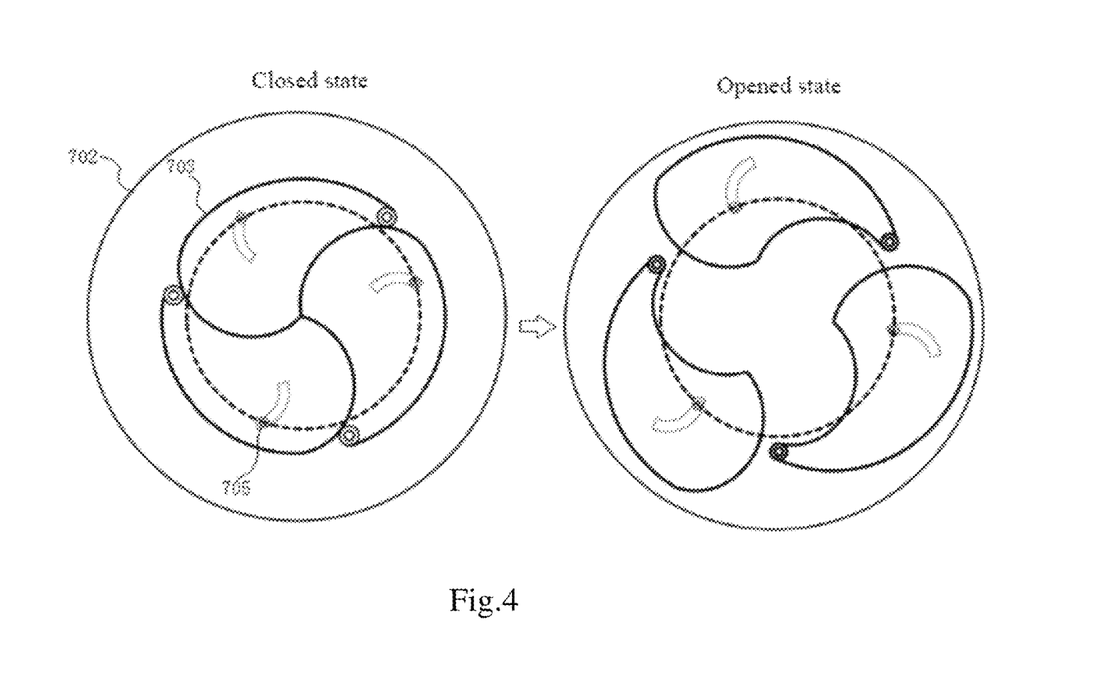
FIG. 4 is a schematic diagram of an opened/closed state a first opening and closing passage in the present disclosure.

As shown in FIG. 4, under the action of an external force, the rotating handle 708 rotates, and the driving wheel 707 drives the driven wheel 706 to rotate. The driven wheel 706 drives the rotating shaft 705 to rotate. The first fan blade 703 rotates with the rotating shaft 705 around a position where the other end is hinged to the fan blade fixing piece 702, thus realizing opening and closing of the first fan blade 703.

Figure 5:
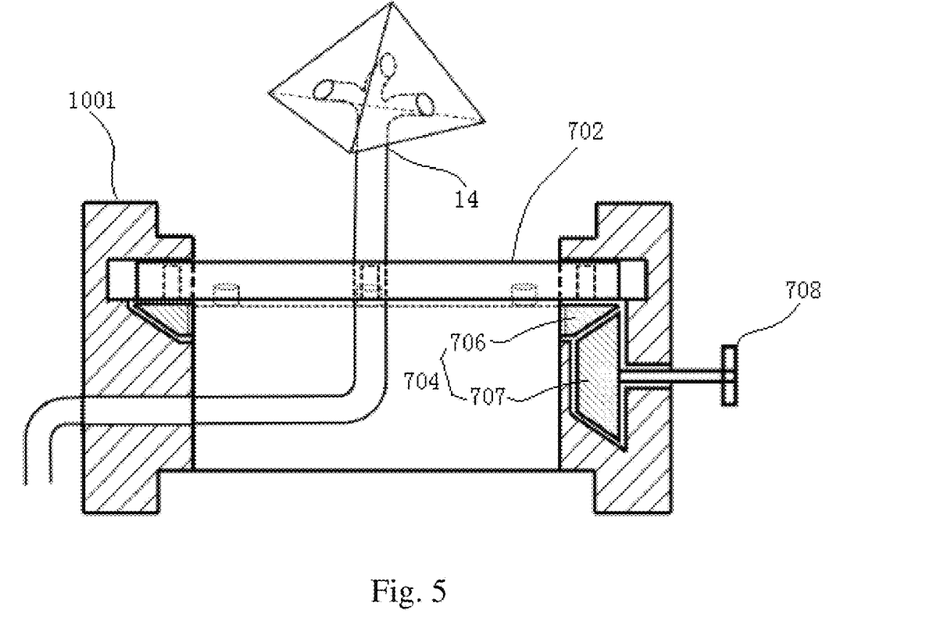
FIG. 5 is a schematic structural diagram of a second opening and closing passage in the present disclosure.

Similarly, as shown in FIG. 5, the second opening and closing passage 10 is composed of a second passage pipe 1001, a fan blade fixing piece 702, a second fan blade 1002, and a transmission pair 704; the ringlike fan blade fixing piece 702 is fixed inside the second passage pipe 1001; three first fan blades 1002 are provided; one end of each second fan blade 1002 is hinged to the fan blade fixing piece 702, and the bottom of the other end of the second fan blade is connected with a driven wheel 706 of the transmission pair 704 through a rotating shaft 705; and the rotating shaft 705 passes through a sliding chute arranged on the fan blade fixing piece 702. The transmission pair 704 here can select mutually perpendicular bevel gears. The rotating shaft 705 is connected with the driven wheel 706 in the transmission pair 704; the driven wheel 706 is sleeved in the second passage pipe 1001 and is engaged with a driving wheel 707; the driving wheel 707 is rotatably arranged in a side wall of the second passage pipe 1001; one side of the driving wheel 707 is provided with a rotating handle 708; and a free end of the rotating handle 708 is located on the outer side of the second passage pipe 1001.

The gas intake pipeline 14 is composed of a gas intake pipe 1401 and a gas sprayer 1402; one end of the gas intake pipe 1401 passes through the side wall of the second passage pipe 1001 and is connected with a gas intake device, and the other end of the gas intake pipe 1401 is connected with the gas sprayer 1402; the gas sprayer 1402 is located at the bottom of the reaction bin 3; and the second fan blade 1002 is in close contact with the outer side wall of the gas intake pipe 1401 at the lower part of the gas sprayer 1402 after being closed. To prevent the gas sprayer 1402 from being blocked, the gas sprayer 1402 is a triangular pyramid or conical, in which three or more gas spray passages are arranged. The tail ends of the gas spray passages are horizontal so that the gas is sprayed out from a horizontal direction to prevent the power generated by the reaction from blocking the gas sprayer 1402.

Figure 6:
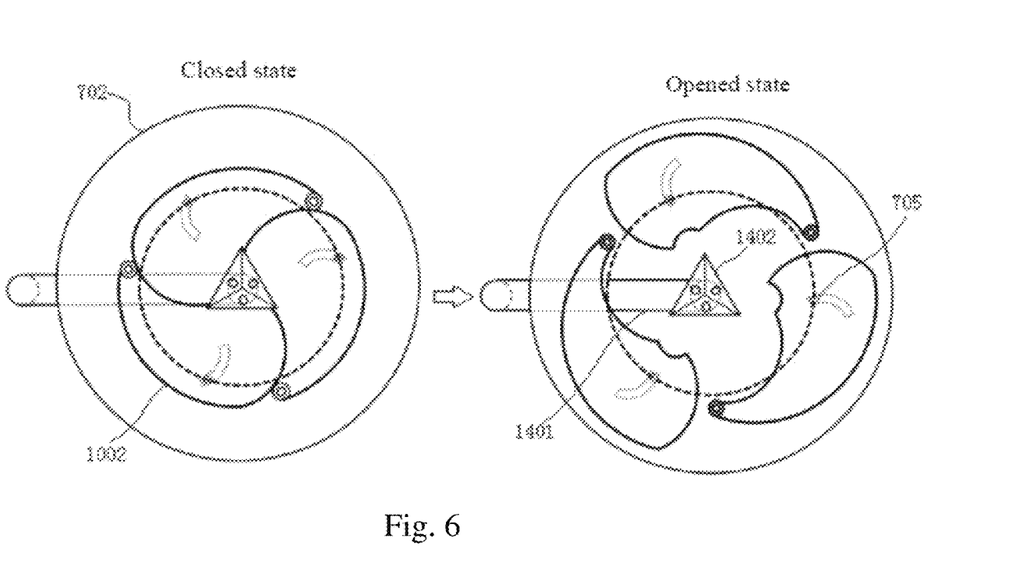
FIG. 6 is a schematic diagram of an opened/closed state a second opening and closing passage in the present disclosure.

As shown in FIG. 6, under the action of an external force, the rotating handle 708 rotates, and the driving wheel 707 drives the driven wheel 706 to rotate. The driven wheel 706 drives the rotating shaft 705 to rotate. The second fan blade 1002 rotates with the rotating shaft 705 around a position where the other end is hinged to the fan blade fixing piece 702, thus realizing opening and closing of the second fan blade 1002.

Figure 2:
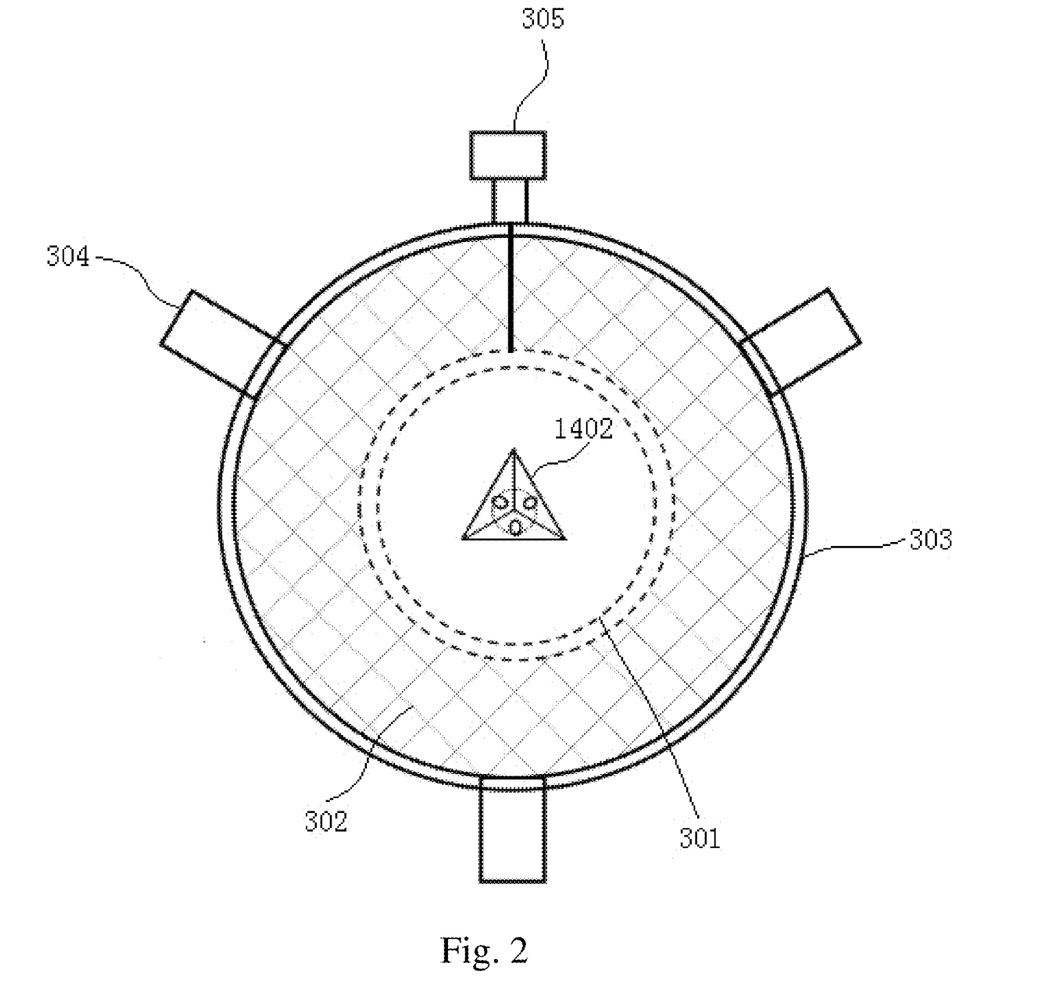
FIG. 2 is a schematic structural diagram of a reaction bin of the present disclosure.

To further increase the reaction rate and reduce the reaction temperature, as shown in FIG. 2, the reaction bin 3 is composed of a heating furnace tube 301, a heat insulation layer 302, a shell 303, a microwave generator 304, and a temperature measurement device 305; the heating furnace tube 301 communicates with the second opening and closing passage 10; a space between the shell 303 and the heating furnace tube 301 is filled with a heat insulation layer 302; and the microwave generator 304 and the temperature measurement device 305 are distributed on the shell 303. To make the heating more uniform and the temperature control more accurate, three rows of the microwave generators 304 are uniformly disposed along a height direction of the heating furnace tube 301; and in each row, three microwave generators are uniformly distributed along a radial direction of the heating furnace tube 301. Three temperature measurement devices 305 that use infrared thermometers are uniformly disposed along the height direction of the heating furnace tube 301. The height is consistent with that of the temperature measurement device 305.

Figure 9:
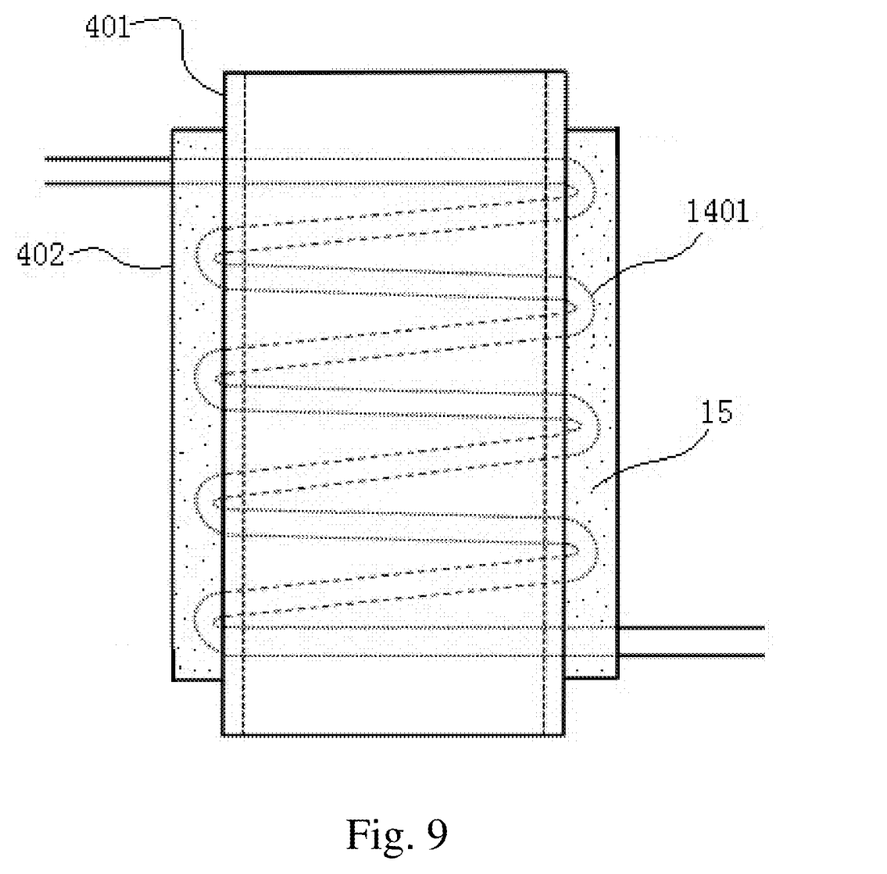
FIG. 9 is a schematic structural diagram of a second transitional bin in the present disclosure.

To further use the high-temperature waste heat of the reacted silicon nitride, as shown in FIG. 9, the second transitional bin 4 is composed of an inner pipe 401 and an outer pipe 402 which are coaxially disposed; the gas intake pipe 1401 is wound on the outer side wall of the inner pipe 401; a gap formed by the outer side wall of the inner pipe 401 and the inner side wall of the outer pipe 402 is filled with a heat insulation material 15.

A specific method for preparing $\beta$-$Si_3N_4$ by using the above device is as follows:

1) The rotating handle 708 is rotated to open the first opening and closing passage 7 between the stock bin 1 and the first transitional bin 2 so that waste fine silicon powder enters the first transitional bin 2 under the action of gravity. The first transitional bin 2 is a hollow pipeline, and the first opening and closing passage 7 is closed. The vacuum pump 12 on the first connection passage 8 is turned on to firstly vacuumize the first transitional bin. After the vacuumizing is completed, the vacuum pump 12 is turned off, and the first transitional bin is then filled with pure $N_2$ from the gas inlet 17. The pressure in the first transitional bin 2 is maintained at 0.1 MPa to 0.3 MPa. The first transitional bin 2 may be made of a transparent quartz glass tube so that the volume of a material inside can be directly observed. By means of the above step, foreign gas, particularly oxygen, in the waste fine silicon powder can be removed to keep the waste fine silicon powder pure and to also make the pressures in the first transitional bin 2 and the reaction bin 3 balanced.

2) The rotating handle 708 is rotated to open the first opening and closing passage 7 between the first transitional bin 2 and the reaction bin 3 so that waste fine silicon powder enters the reaction bin 3. The material enters the rotating chute via the transfer guide plate and is uniformly distributed in the heating furnace tube 301 of the reaction bin 3. The heating furnace tube 301 uses an alundum tube, and the external heat insulation layer is filled by polycrystalline mullite fibers. The temperature measurement device 305 uses an infrared thermometer.

The gas intake pipeline at the bottom sprays $N_2$ and $NH_3$ mixed gas. $N_2$ and $NH_3$ are mixed according to a ratio of 3:1 and are blown into the heating furnace tube 301 at a speed of 0.4 m/s so that the waste fine silicon powder is suspended and forms a vortex flow. After the waste fine silicon powder all enters the reaction bin 3, the first opening and closing passage 7 between the first transitional bin 2 and the reaction bin 3 is closed, and the microwave generator 304 is synchronously turned on to heat the reactant at a temperature rise rate of 100° C./min. When the temperature in the reaction bin 3 reaches 1250+/−100° C., this temperature is maintained for 5 to 20 min. The gas pressure in the reaction bin 3 is maintained at 0.1 MPa to 0.3 MPa. Redundant gas is discharged through the pressure exhaust valve 13 and is then recycled.

3) In the reaction process, the second transitional bin 4 is synchronously vacuumized firstly and is then filled with the pure $N_2$, and the pressure is maintained at 0.1 MPa to 0.3 MPa. After the reaction of the material in the reaction bin 3 ends, the second opening and closing passage 10 between the reaction bin 3 and the second transitional bin 4 is opened. After a reaction product enters the second transitional bin 4, the second opening and closing passage 10 is closed. The first opening and closing passage 7 between the second transitional bin 4 and the conveying bin 5 is opened, and the reaction product, i.e., silicon nitride, enters, through the conveying bin 5, enters the collection bin 6 for collection and storage.

After the waste fine silicon powder all enters the reaction bin 3, the first opening and closing passage 7 between the stock bin 1 and the first transitional bin 2 is opened again, and the waste fine silicon powder enters the first transitional bin 2 under the action of gravity. The first transitional bin is firstly vacuumized and is then filled with the $N_2$. The steps 1) to 3) are repeated. After the waste fine silicon powder enters the second transitional bin 4 from the reaction bin 3, the next batch of waste fine silicon powder enters the reaction bin 3 from the first transitional bin 2, and at the same time, another batch of waste fine silicon powder enters the first transitional bin 2 from the stock bin 1. In this way, continuous production of the $\beta$-$Si_3N_4$ is realized.

Figure 10:
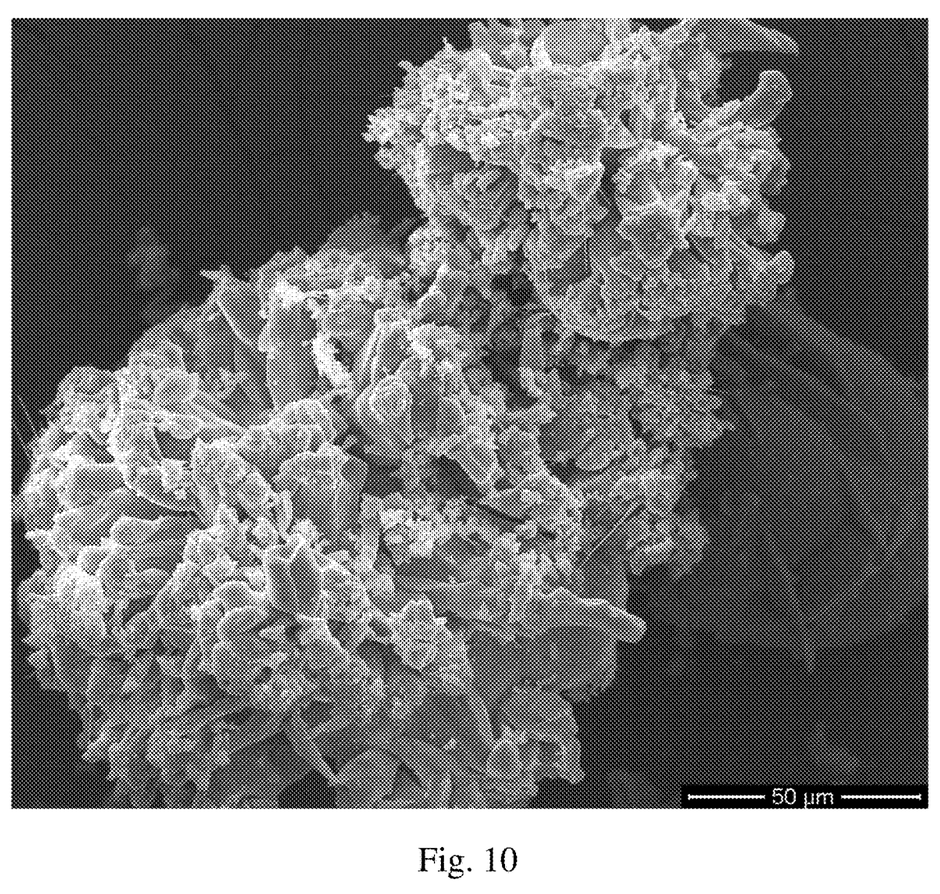
FIG. 10 is a diagram of a macro appearance of a $\beta$-$Si_3N_4$ material prepared in the present disclosure.
Figure 11:
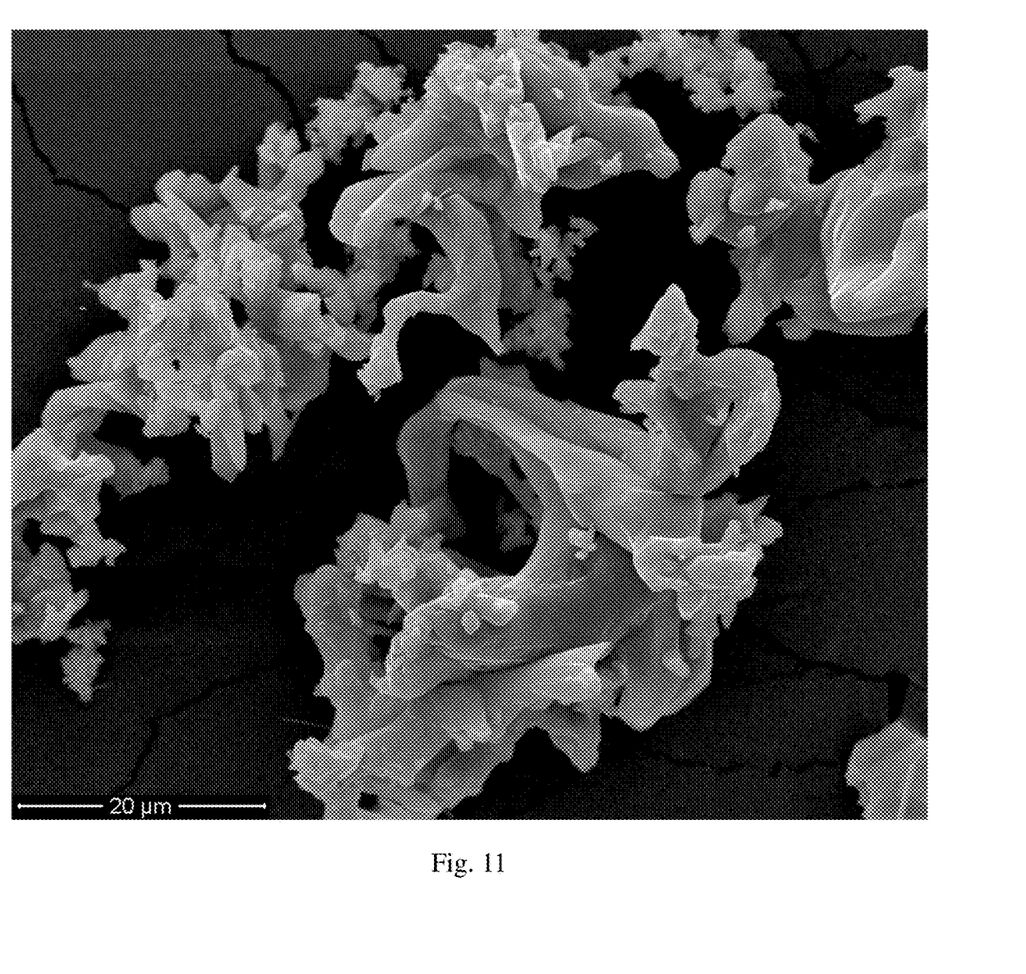
FIG. 11 is a diagram of a micro appearance of a $\beta$-$Si_3N_4$ material prepared in the present disclosure.

The silicon powder is heated to 1250° C. under the nitrogen pressure of 121 kPa and is then maintained for 20 min, which achieves a good nitriding effect, and the transformation rate of the nitridation reaction can be up to 97.96%. Products mainly include uniformly shaped and columnar $\beta$-$Si_3N_4$, as shown in FIG. 10 and FIG. 11. Compared with a traditional preparation method, this method has the advantages that the nitridation reaction time is shortened by 77.7% or above, the energy consumption is reduced by 88.6%, and the preparation efficiency of $Si_3N_4$ is improved.

Although the present disclosure has been described with reference to a number of explanatory embodiments of the present disclosure, it should be understood that many other modifications and implementation modes can be devised by those skilled in the art. These modifications and implementation modes will fall within the scope and spirit of principles of the disclosure of the present application. More specifically, within the scope of the disclosure, drawings, and claims of the present application, various variations and improvements can be made to the component parts or the layout. In addition to the variations and improvements of the component parts or the layout, other uses will also be obvious to those skilled in the art.

What is claimed is:

1. A device for rapidly preparing $\beta$-$Si_3N_4$ by gas-solid reaction, comprising a stock bin, a first transitional bin, a reaction bin, a second transitional bin, a conveying bin, and a collection bin, wherein the bottom of the stock bin communicates with a first opening and closing passage, a first connection passage, and the top of the first transitional bin in sequence; the bottom of the first transitional bin communicates with the first opening and closing passage, a second connection passage, and the top of the reaction bin in sequence; the bottom of the reaction bin communicates with a second opening and closing passage, the first connection passage, and the top of the second transitional bin in sequence; the bottom of the second transitional bin communicates with the top of the conveying passage through the first opening and closing passage; a material outlet of the conveying bin communicates with the collection bin; the first connection passage is a hollow pipeline and is provided with a pressure gauge, a vacuum pump, and a gas inlet on a side wall; the second connection passage is a hollow pipeline and is provided with a pressure gauge and a pressure exhaust valve on a side wall; and a gas intake pipeline is arranged in the middle of the second opening and closing passage.

2. The device for rapidly preparing the $\beta$-$Si_3N_4$ by gas-solid reaction according to claim 1, wherein the first opening and closing passage is composed of a first passage pipe, a fan blade fixing piece, at least three first fan blades, and a transmission pair; a ringlike fan blade fixing piece is fixed inside the first passage pipe; at least three first fan blades are provided; one end of each first fan blade is hinged to the fan blade fixing piece, and the bottom of the other end of the first fan blade is connected with a driven wheel of the transmission pair through a rotating shaft; the driven wheel is sleeved in the first passage pipe; the driven wheel is engaged with a driving wheel; the driving wheel is rotatably arranged in a side wall of the first passage pipe; one side of the driving wheel is provided with a rotating handle; and a free end of the rotating handle is located on an outer side of the first passage pipe.

3. The device for rapidly preparing the $\beta$-$Si_3N_4$ by gas-solid reaction according to claim 1, wherein the second opening and closing passage is composed of a second passage pipe, a fan blade fixing piece, at least three second fan blades, and a transmission pair; a ringlike fan blade fixing piece is fixed inside the second passage pipe; at least three second fan blades are provided; one end of each second fan blade is hinged to the fan blade fixing piece, and the bottom of the other end of the second fan blade is connected with a driven wheel of the transmission pair through a rotating shaft; the driven wheel is sleeved in the second passage pipe; the driven wheel is engaged with a driving wheel; the driving wheel is rotatably arranged in a side wall of the second passage pipe; one side of the driving wheel is provided with a rotating handle; a free end of the rotating handle is located on an outer side of the second passage pipe;

the gas intake pipeline is composed of a gas intake pipe and a gas sprayer; one end of the gas intake pipe passes through the side wall of the second passage pipe and is connected with a gas intake device, and the other end of the gas intake pipe is connected with the gas sprayer; the gas sprayer is located at the bottom of the reaction bin; and at least three second fan blades is in close contact with an outer side wall of the gas intake pipe at the lower part of the gas sprayer after being closed.

4. The device for rapidly preparing the $\beta$-$Si_3N_4$ by gas-solid reaction according to claim 1, wherein a transfer guide plate is arranged on an inner side of the top of the second connection passage, and a rotating chute is arranged below the transfer guide plate.

5. The device for rapidly preparing the $\beta$-$Si_3N_4$ by gas-solid reaction according to claim 1, wherein the reaction bin is composed of a heating furnace tube, a heat insulation layer, a shell, at least one microwave generator, and at least one temperature measurement device; the heating furnace tube communicates with the second opening and closing passage; a space between the shell and the heating furnace tube is filled with a heat insulation layer; and the at least one microwave generator and the at least one temperature measurement device are distributed on the shell.

6. The device for rapidly preparing the $\beta$-$Si_3N_4$ by gas-solid reaction according to claim 5, wherein the at least one microwave generator comprises nine microwave generators, and the at least one temperature measurement device comprises three temperature measurement devices; the nine microwave generators are uniformly disposed along a height direction of the heating furnace tube as three rows; in each of the three rows, three of the nine microwave generators are uniformly distributed along a radial direction of the heating furnace tube; and the three temperature measurement devices are uniformly provided along the height direction of the heating furnace tube.

7. The device for rapidly preparing the $\beta$-$Si_3N_4$ by gas-solid reaction according to claim 3, wherein the second transitional bin is composed of an inner pipe and an outer pipe which are coaxially disposed; the gas intake pipe is wound on an outer side wall of the inner pipe; a gap formed by the outer side wall of the inner pipe and an inner side wall of the outer pipe is filled with a heat insulation material to preheat gas in the gas intake pipe.

8. The device for rapidly preparing the $\beta$-$Si_3N_4$ by gas-solid reaction according to claim 1, wherein the conveying bin is L-shaped, a horizontal section of which is internally provided with a transfer screw rod; one end of the transfer screw rod is connected with a motor; and the collection bin is arranged below the other end of the transfer screw rod.

9. The device for rapidly preparing the $\beta$-$Si_3N_4$ by gas-solid reaction according to claim 8, wherein a water cooling device is arranged on an outer side wall of the horizontal section of the conveying bin.

10. A method for rapidly preparing $\beta$-$Si_3N_4$ by gas-solid reaction by using the device according to claim 1 comprising:
opening the first opening and closing passage between the stock bin and the first transitional bin so that waste fine silicon powder enters the first transitional bin, closing the first opening and closing passage, vacuumizing the first transitional bin, filling the first transitional bin with pure $N_2$, and maintaining a pressure at 0.1 MPa to 0.3 MPa;
opening the first opening and closing passage between the first transitional bin and the reaction bin so that the waste fine silicon powder enters the reaction bin (3), spraying at least one of $N_2$ and $NH_3$ by the gas intake pipeline, synchronously heating reactants at a temperature rise rate of 100° C./min, maintaining a temperature for 5 min to 20 min when the temperature in the reaction bin reaches 1250+/−100° C., and maintaining a gas pressure in the reaction bin at 0.1 MPa to 0.3 MPa;
in a reaction process, synchronously vacuumizing the second transitional bin, then filling the second transitional bin with the pure $N_2$, and maintaining the pressure at 0.1 MPa to 0.3 MPa; after the reaction process ends, opening the second opening and closing passage between the reaction bin and the second transitional bin; and after reaction products enter the second transitional bin, opening the first opening and closing passage between the second transitional bin and the conveying bin so that the reaction products enter, through the conveying bin, the collection bin for collection and storage.

11. The method according to claim 10, wherein in the device, the first opening and closing passage is composed of a first passage pipe, a fan blade fixing piece, at least three first fan blades, and a transmission pair; a ringlike fan blade fixing piece is fixed inside the first passage pipe; at least three first fan blades are provided; one end of each first fan blade is hinged to the fan blade fixing piece, and the bottom of the other end of the first fan blade is connected with a driven wheel of the transmission pair through a rotating shaft; the driven wheel is sleeved in the first passage pipe; the driven wheel is engaged with a driving wheel; the driving wheel is rotatably arranged in a side wall of the first passage pipe; one side of the driving wheel is provided with a rotating handle; and a free end of the rotating handle is located on an outer side of the first passage pipe.

12. The method according to claim 10, wherein in the device, the second opening and closing passage is composed of a second passage pipe, a fan blade fixing piece, at least three second fan blades, and a transmission pair; a ringlike fan blade fixing piece is fixed inside the second passage pipe; at least three second fan blades are provided; one end of each second fan blade is hinged to the fan blade fixing piece, and the bottom of the other end of the second fan blade is connected with a driven wheel of the transmission pair through a rotating shaft; the driven wheel is sleeved in the second passage pipe; the driven wheel is engaged with a driving wheel; the driving wheel is rotatably arranged in a side wall of the second passage pipe; one side of the driving wheel is provided with a rotating handle; a free end of the rotating handle is located on an outer side of the second passage pipe; the gas intake pipeline is composed of a gas intake pipe and a gas sprayer; one end of the gas intake pipe passes through the side wall of the second passage pipe and is connected with a gas intake device, and the other end of the gas intake pipe is connected with the gas sprayer; the gas sprayer is located at the bottom of the reaction bin; and at least three second fan blades is in close contact with an outer side wall of the gas intake pipe at the lower part of the gas sprayer after being closed.

13. The method according to claim 10, wherein in the device, a transfer guide plate is arranged on an inner side of the top of the second connection passage, and a rotating chute is arranged below the transfer guide plate.

14. The method according to claim 10, wherein in the device, the reaction bin is composed of a heating furnace tube, a heat insulation layer, a shell, at least one microwave generator, and at least one temperature measurement device; the heating furnace tube communicates with the second opening and closing passage; a space between the shell and the heating furnace tube is filled with a heat insulation layer; and the at least one microwave generator and the at least one temperature measurement device are distributed on the shell.

15. The method according to claim 14, wherein the at least one microwave generator comprises nine microwave generators, and the at least one temperature measurement device comprises three temperature measurement devices; the nine microwave generators are uniformly disposed along a height direction of the heating furnace tube as three rows; in each of the three rows, three of the nine microwave generators are uniformly distributed along a radial direction of the heating furnace tube; and the three temperature measurement devices are uniformly provided along the height direction of the heating furnace tube.

16. The method according to claim 12, wherein in the device, the second transitional bin is composed of an inner pipe and an outer pipe which are coaxially disposed; the gas intake pipe is wound on an outer side wall of the inner pipe; a gap formed by the outer side wall of the inner pipe and an inner side wall of the outer pipe is filled with a heat insulation material to preheat gas in the gas intake pipe.

17. The method according to claim 10, wherein in the device, the conveying bin is L-shaped, a horizontal section of which is internally provided with a transfer screw rod; one end of the transfer screw rod is connected with a motor; and the collection bin is arranged below the other end of the transfer screw rod.

18. The method according to claim 17, wherein in the device, a water cooling device is arranged on an outer side wall of the horizontal section of the conveying bin.

* * * * *